United States Patent Office 3,185,983
Patented May 25, 1965

3,185,983
DIRECTION RESPONSIVE RADAR SYSTEM WITH IMPROVED TARGET DETECTION CIRCUIT
Guy Le Parquier, Paris, France, assignor to Compagnie Generale de Telegraphie Sans Fil, a corporation of France
Filed Apr. 26, 1961, Ser. No. 105,773
Claims priority, application France, May 4, 1960, 826,165
5 Claims. (Cl. 343—17.1)

The present invention relates to radar systems and more particularly to surveillance radar systems.

It is an object of the invention to provide an improved radar receiver system capable of detecting targets in spite of an interference source.

A radar receiver system according to the invention comprises aerial means for collecting two signals for every signal radiated by a source or reflected by a target lying within the reach of the aerial, the aerial system having two separate outputs for the two received signals so that a signal depending substantially only on the position of its source relative to a reference frame tied to the aerial system is provided. Means are also provided for selecting from the received signals a pulsed component having the same duration as the radiated signals.

Figure 1:
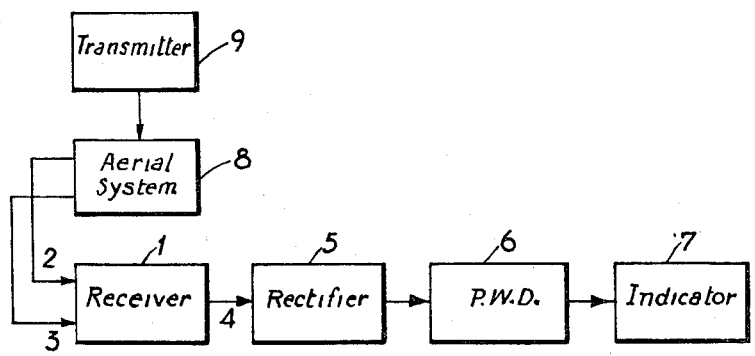
Figure 2:
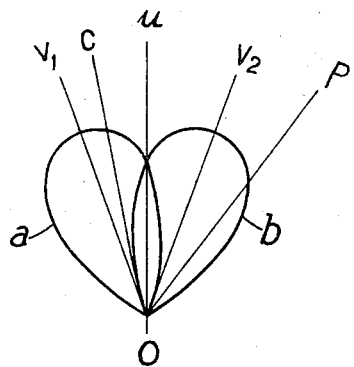

The invention will be best understood from the following description and appended drawings, wherein:

FIG. 1 is a block diagram of a radar receiver system according to the invention; and FIG. 2 is a diagram illustrating the operation of the system shown in FIG. 1.

The radar receiver system according to the invention shown in FIG. 1 comprises a receiver circuit 1 which is coupled to a scanning aerial system 8. Aerial 8 is arranged for collecting each signal incoming from a given source, lying within the reach of the aerial, as two different signals. To this end, it may comprise two receiving elements, or antenna portions, each of said portions being itself simple or complex, and the two portions being rigidly tied to each other and having respective outputs 2 and 3, both coupled to the input of the receiver circuit 1. For example, a monopulse type aerial may be used.

The output 4 of the receiver circuit is coupled to a selector circuit which in the embodiment shown comprises, for example, a full wave rectifier, followed by a pulse width discriminator 6 which is also called a pulse duration discriminator. Discriminator 6 is connected to an indicator 7.

As already mentioned in the presence of a single source of signals, which may be either a radiating source or a target, receiver 1 delivers at its output 4 a signal Q which depends only on the position of this source, with respect to a system of axes tied to the aerial system 8 comprising two aerial ports, 8a and 8b.

Aerials delivering two signals $a$ and $b$ to the receiver and receiver circuits capable of deriving therefrom the above signal Q are well known in the art. For example, an aerial of the type used in monopulse amplitude radar systems may be used as aerial 8. In such an aerial the signal Q which is the pointing error signal, is a video frequency signal substantially equal to $$K \cdot \frac{(A-B)}{(A+B)}$$

where A and B are the respective amplitudes of signals $a$ and $b$ collected by two aerial elements, which are symmetrical with respect to a given plane, and K is a constant. Aerials of the type as used in monopulse phase radars may also be used. These examples are of course non limitative. Any type of receiver delivering a signal Q which depends only on the relative position of the source and the aerial system may be used. By way of example, it will be assumed in the present specification that the aerial system 6 and the receiver circuit 1 are of the type employed in an amplitude monopulse radar delivering a signal Q which is substantially proportional to $$(A-B)/(A+B)$$

aerial system 8, which includes a duplexer, being coupled to the radar transmitter system 9.

As to the full wave rectifier 5 it may comprise as is well known in the art, two parallel channels having a common input and a common output, one of said channels comprising a rectifier and the other a polarity inverter and a further rectifier connected as the former one. The polarity inverter may, for example, be built up by an amplifier having a gain equal to $-1$.

The system shown in FIG. 1 operates as follows. It is assumed to be in the presence of a jamming source P and of a target C, both lying within the receiving pattern of the aerial. This pattern comprises two lobes indicated by reference characters $a$ and $b$ which were also used to indicate the corresponding received signals. In the example considered the two lobes are assumed to be symmetrical with respect to a plane O$u$, O being the intersection of the two lobe axes OV$_1$ and OV$_2$. The lobes correspond respectively to the two portions of the aerial system mentioned hereinabove. The whole of the receiver's pattern, in this example, rotates around an axis perpendicular in O to the plane of the figure.

Source P may transmit either continuous or discrete signals and the target C reflects the pulses transmitted by transmitter 9, which pulses, according to the known art, are transmitted by the whole of the monopulse aerial.

As mentioned above, the receiver 1 and aerial system 8 are such that the level of the signals Q depends only on the position of the radiating source with respect to the aerial system. The receiver is thus non responsive to the modulation of the modulated incoming signals.

When only signals from the jamming or interfering source P exist, a signal $Q_p$ is collected. Its maximum duration, corresponds to the time interval during which the receiving pattern sweeps source P. The amplitude of the received signal is modulated at a low frequency only as a function of the angular position of the straight line OP with respect to above mentioned symmetry plane of the aerial system 8, i.e. if the source is stationary as a function of the scanning movement of the aerial. The variations of the angular position of line OP, due to any displacement of source P itself are by themselves usually slow with respect to the rotation of the aerial.

When only signals $Q_s$, reflected from target C, which is not a self-contained radiating source, are collected, the latter are signals of a short duration, equal to the duration of a radar pulse.

In the simultaneous presence of source P and of target C, a signal $Q_{p+s}$ is obtained at the output 4 of receiver 1, each time an echo is reflected from target C. This signal is obviously no longer a pointing error signal as was signal $Q_s$. However, since this signal is very short with respect to the low frequency modulation affecting signal $Q_p$, it may be considered as an impulsive fluctuation affecting the amplitude of signal $Q_p$ each time an echo is received, and may thus be used for the detection of the corresponding target.

To this end, the signal Q collected at the output 4 of the receiver 1, which, in the example illustrated, is a video frequency signal, positive or negative, is applied to rectifier 5.

The output signal of rectifier 5 is applied to pulse width discriminator 6 of any known type, which passes only the impulsive fluctuations having the same duration as the echoes of the radiated signals, while eliminating any undesirable components, especially the very low frequency component resulting from the aerial rotation. The output signal of discriminator 6 is applied to an oscilloscope or any other display device 7.

It is to be noted that if source P transmits discrete signals, signals $Q_s$ corresponding to the echo-pulses received during the time intervals separating these discrete signals will also pass through the selector unit and will be applied to the display device.

Of course, if signal Q is a constant polarity video signal, rectifier 5 may be omitted.

It is to be understood that the invention is in no way limited to the example shown which is given only by way of example. For instance, the invention does not depend on the structure of signal Q, or on the manner in which it was obtained as long as it fulfils the above indicated condition, of depending only on the position, relative to the aerial system, of the target or source by which it is reflected or radiated.

Also the nature of the selector device is in no way critical, provided the impulsive fluctuations resulting from the presence of a reflecting target is selected.

The system of the invention is particularly effective against interference or jamming sources transmitting continuous or comparatively long signals. It suffices, for it to be operative, that the jamming signals should not be chopped in such a manner that a discrimination between signal $Q_p$ on one hand, and signals $Q_{p+s}$ and $Q_s$, on the other would no longer be possible.

I claim:

1. A pulse radar system comprising transmitting means for transmitting pulses of predetermined duration; aerial means comprising at least two receiving parts having respective outputs; receiving means coupled to said outputs for deriving from the echo signals collected by said aerial means other signals which, in the presence of only one source of radiation, are substantially dependent only upon the angular location of said source relative to a reference frame tied to said aerial means; selecting means coupled to said receiving means for selecting, among said other signals, pulse signals having substantially said predetermined duration and signal portions corresponding to impulsive signal level fluctuations having substantially said predetermined duration; means for indicating the presence of a target coupled to said selecting means.

2. A radar system comprising: aerial means of the monopulse type comprising two parts, said parts being symmetrical with respect to a plane and having respective outputs; transmitting means for transmitting pulses of predetermined duration through said aerial means; receiving means coupled to said outputs for deriving from the signals collected by said two parts other signals which, in the presence of only one source of radiation, are pointing error signals with respect to said plane; a selecting circuit for selecting, among said other signals, pulses having substantially said predetermined duration and signal portions corresponding to impulsive signal level fluctuations having substantially said predetermined duration; means for applying said other signals to said selecting circuit; and means coupled to said selecting circuit for indicating the presence of a target.

3. A radar system comprising: aerial means of the monopulse type comprising two parts, said parts being symmetrical with respect to a plane and having respective outputs; means for transmitting pulses of predetermined duration through said aerial means; receiving means coupled to said outputs for deriving from the signals collected by said two parts detected signals which in the presence of only one source of radiation are pointing error signals with respect to said plane; a selecting circuit having an input and an output and comprising a rectifying circuit and a pulse width discriminator serially connected; means for applying said detected signals to said selecting circuit input; an indicating means; and means for applying the output signals of said selecting circuit to said indicating means as indicative of the presence of a target.

4. A radar system as claimed in claim 2 wherein said aerial means are rotatable.

5. A radar system as claimed in claim 3 wherein said aerial means are rotatable.

References Cited by the Examiner
UNITED STATES PATENTS

| | | | |
|---|---|---|---|
| 2,682,656 | 6/54 | Phillips | 343—16.1 |
| 2,768,372 | 10/56 | Green | 343—100.7 |
| 2,980,906 | 4/61 | McClellan | 343—16 |
| 3,098,226 | 7/63 | Revillon | 343—16.1 |
| 3,117,313 | 1/64 | Mortley | 343—17.1 |

CHESTER L. JUSTUS, *Primary Examiner.*